(12) United States Patent
Murray

(10) Patent No.: US 12,515,310 B2
(45) Date of Patent: Jan. 6, 2026

(54) ELECTRIC POWER TRANSMISSION STRUCTURE MAINTENANCE APPARATUS AND METHOD

(71) Applicant: Electric Power Research Institute, Inc., Charlotte, NC (US)

(72) Inventor: Neal Scott Murray, Mint Hill, NC (US)

(73) Assignee: Electric Power Research Institute, Inc., Charlotte, NC (US)

( * ) Notice: Subject to any disclaimer, the term of this patent is extended or adjusted under 35 U.S.C. 154(b) by 660 days.

(21) Appl. No.: 17/704,368

(22) Filed: Mar. 25, 2022

(65) Prior Publication Data
US 2023/0311296 A1    Oct. 5, 2023

(51) Int. Cl.
*B25J 5/02*     (2006.01)
*B25J 9/10*     (2006.01)
*B25J 11/00*    (2006.01)

(52) U.S. Cl.
CPC ............... *B25J 5/02* (2013.01); *B25J 9/102* (2013.01); *B25J 11/005* (2013.01)

(58) Field of Classification Search
CPC ... B25J 5/02; B25J 9/102; B25J 11/005; B25J 11/00; B25J 5/04; H02G 1/02
See application file for complete search history.

(56) References Cited

U.S. PATENT DOCUMENTS 10,509,415 B2 * 12/2019 Bosworth ............... B64C 13/08

FOREIGN PATENT DOCUMENTS

| CN | 113500580 A | * | 10/2021 | ............... B25J 11/00 |
| WO | WO-2022116265 A1 | * | 6/2022 | ............... B23P 19/06 |

OTHER PUBLICATIONS

English Translation of WO2022116265 (Year: 2022).*

* cited by examiner

*Primary Examiner* — Victor L MacArthur
(74) *Attorney, Agent, or Firm* — Curatolo Sidoti & Trillis Co., LPA; Salvatore A. Sidoti; Floyd Trillis, III

(57) ABSTRACT

A power transmission structure maintenance apparatus is disclosed. The power transmission structure maintenance apparatus includes a first climber; a second climber spaced from the first climber; a carrier assembly positioned between the first and second climbers and slidably connected at a first end to the first climber and at a second end to the second climber; and a carriage positioned on the carrier assembly and including a robotic arm. The carriage is moveable along the carrier assembly to position the robotic arm in a predetermined position along a power transmission structure to allow the robotic arm to perform maintenance on the power transmission structure.

24 Claims, 20 Drawing Sheets

ELECTRIC POWER TRANSMISSION STRUCTURE MAINTENANCE APPARATUS AND METHOD

BACKGROUND OF THE INVENTION

This invention relates generally to an electric power transmission structure maintenance apparatus and method, and more particularly to an apparatus and method for maintaining transmission line structures.

There are a large number of overhead transmission line structures, such as towers, throughout the world that are reaching end of life and are in need of life extension maintenance such as structural repairs and coating system applications. Structural repairs are the costliest; however, the incidence of repairs may be reduced through proper corrosion control.

In atmospheric service, a coating system application results in the best efficacy as a corrosion control measure; however, a recoat operation is costly due to manpower requirements, size, locations, and geometries of the structures. Traditionally, utility workers, such as linemen, climb the structures, inspect and remove any loose paint, and apply a new coating system to the structures using paint brushes and/or rollers as they descend the structure. This creates a labor-intensive task that involves climbing risks, thereby endangering the utility workers.

Accordingly, there is a need for an electric power transmission structure maintenance apparatus and method of moving along the structures to prep the structures and apply a coating system thereto.

BRIEF SUMMARY OF THE INVENTION

This need is addressed by providing a power transmission structure maintenance apparatus capable of traversing a structure while it preps the structure and applies a coating system thereto.

According to an aspect of the technology described herein, a power transmission structure maintenance apparatus includes a first climber; a second climber spaced from the first climber; a carrier assembly positioned between the first and second climbers and slidably connected at a first end to the first climber and at a second end to the second climber; and a carriage positioned on the carrier assembly and including a robotic arm, the carriage moveable along the carrier assembly to position the robotic arm in a predetermined position along a power transmission structure to allow the robotic arm to perform maintenance on the power transmission structure According to another aspect of the invention, a method of maintaining a power transmission structure includes providing a maintenance apparatus, comprising: a first climber; a second climber spaced from the first climber; a carrier assembly positioned between the first and second climbers and slidably connected at a first end to the first climber and at a second end to the second climber; and a carriage positioned on the carrier assembly and including a robotic arm, the carriage moveable along the carrier assembly to allow the robotic arm to perform maintenance on the power transmission structure. The method further including coupling the maintenance apparatus to the power transmission structure at or near ground level; using a surface preparation tool manipulated by the robotic arm to prepare a surface of the power transmission structure; and using a coating application tool manipulated by the robotic arm to apply a coating to the prepared surface of the power transmission structure.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
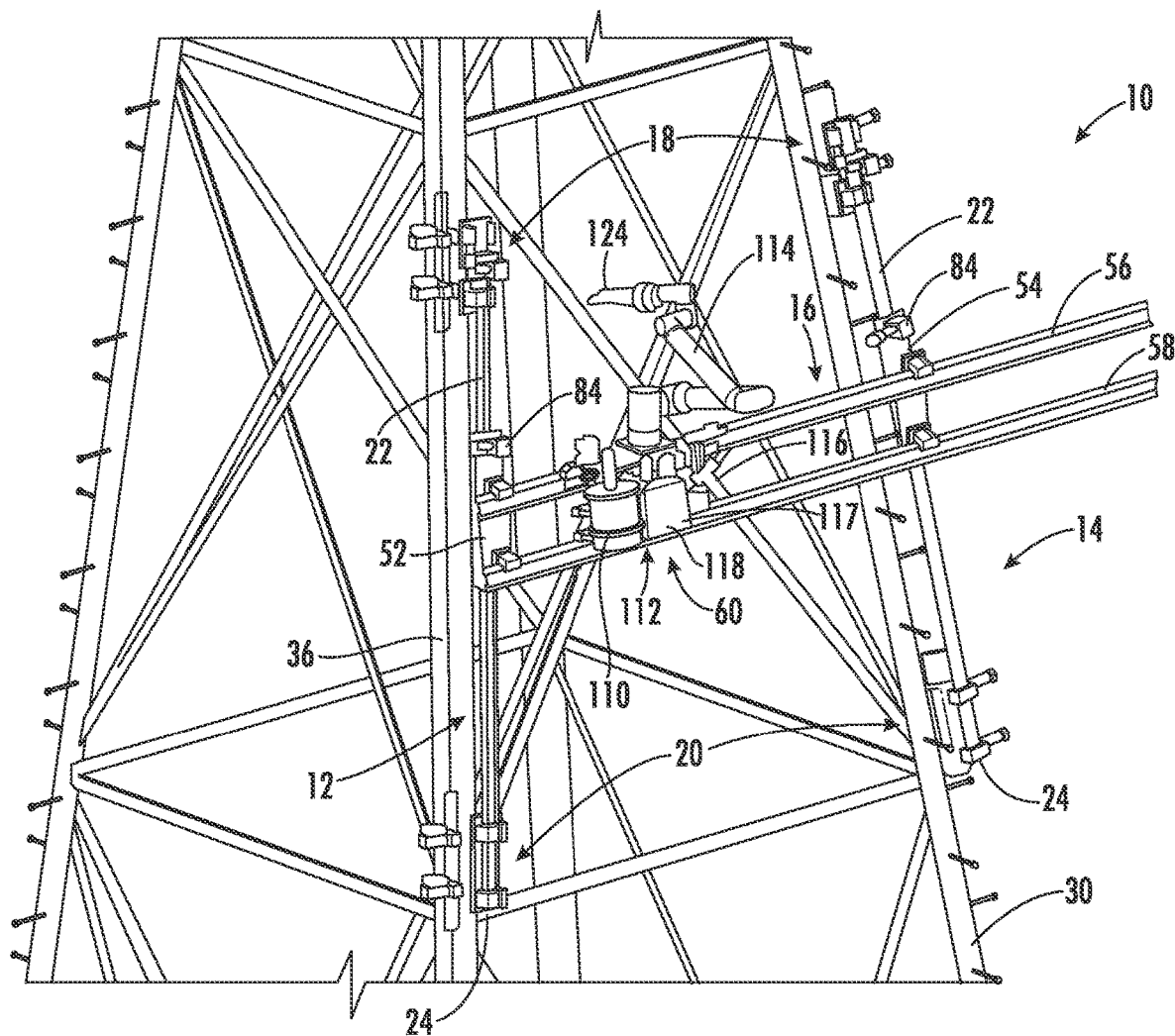
FIG. 1 shows a power transmission structure maintenance apparatus.

Referring to the drawings wherein identical reference numerals denote the same elements throughout the various views, FIG. 1 illustrates a power transmission structure maintenance apparatus 10. The apparatus 10 includes a first climber 12, a second climber 14, and a carrier assembly 16 positioned between the first and second climbers 12 and 14. The first and second climbers 12, 14 each include an upper gripper assembly 18, a lower gripper assembly 20, and a rail 22 positioned therebetween. While the apparatus 10 is being discussed below with the upper and lower gripper assemblies 18 and 20, it should be appreciated that other forms of attachment may be used, for example, magnetic wheels or treads and suction.

Figure 3:
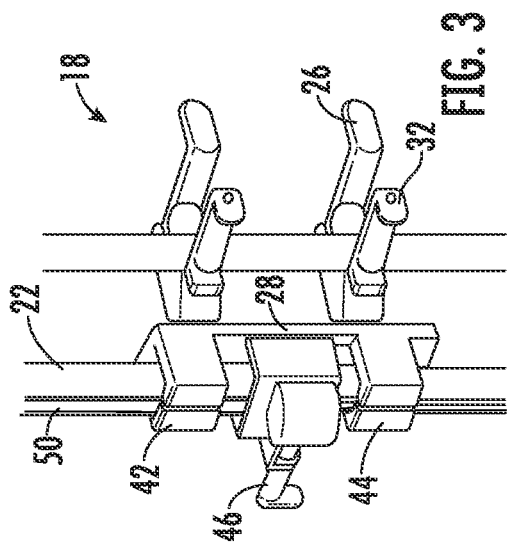
FIG. 3 shows an upper gripper assembly of the apparatus of FIG. 1.
Figure 4:
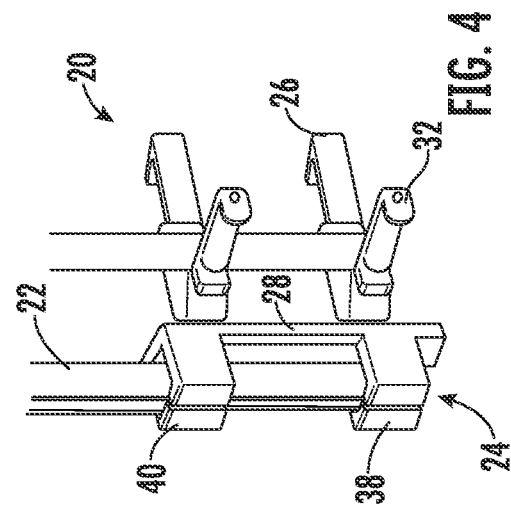
FIG. 4 shows a lower gripper assembly of the apparatus of FIG. 1.
Figure 2:
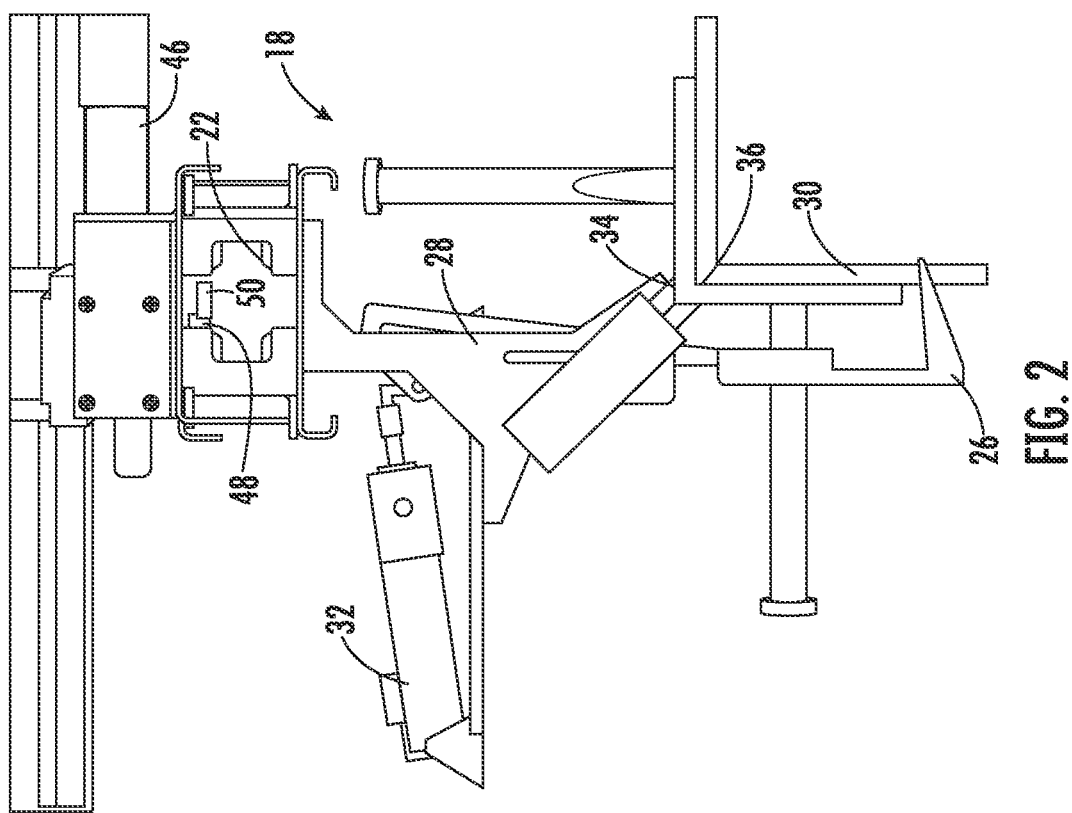
FIG. 2 shows a gripper assembly of the apparatus of FIG. 1.

As shown in FIGS. 2-4, the gripper assembly 18 is moveably connected to the rail 22 while the lower gripper assembly 20 is secured to a bottom 24 of the rail 22. Each of the gripper assemblies 18 and 20 include hooks 26 that are pivotally mounted to a base 28 to allow the hooks to engage and disengage the power transmission structure 30. The hooks 26 are moved between engagement and non-engagement of the power transmission structure 30 by a prime driver 32 such as pneumatic/hydraulic cylinder or electric motor. The gripper assemblies 18 and 20 also include rollers 34 connected to the base 28 to allow the gripper assemblies 18 and 20 to engage and roll along a corner 36 of the power transmission structure 30. As shown in FIG. 4, the base 28 of the lower gripper assembly 20 is secured to the rail 22 by a pair of clamps 38 and 40; however, it should be appreciated that the base 28 may be secured to the rail 22 by any suitable means such as direct connection by fasteners, magnets, and/or adhesives.

As shown in FIG. 3, the upper gripper assembly 18 is secured to the rail 22 by guides 42 and 44. Unlike the clamps 38 and 40, guides 42 and 44 allow the upper gripper assembly 18 to move along rail 22. The upper gripper assembly 18 also includes a motor 46 to move the upper gripper assembly 18 along the rail 22. The motor 46 may be any suitable type of motor to move the upper gripper assembly 18. The motor 46 is connected to a gear 48 that is rotated by the motor 46. The gear 48 is operably connected to a gear track 50 positioned on the rail 22. As the motor 46 rotates the gear 48, the gear 48 interacts with gear track 50 to move the upper gripper assembly 18 back and forth along the rail 22.

Figure 5:
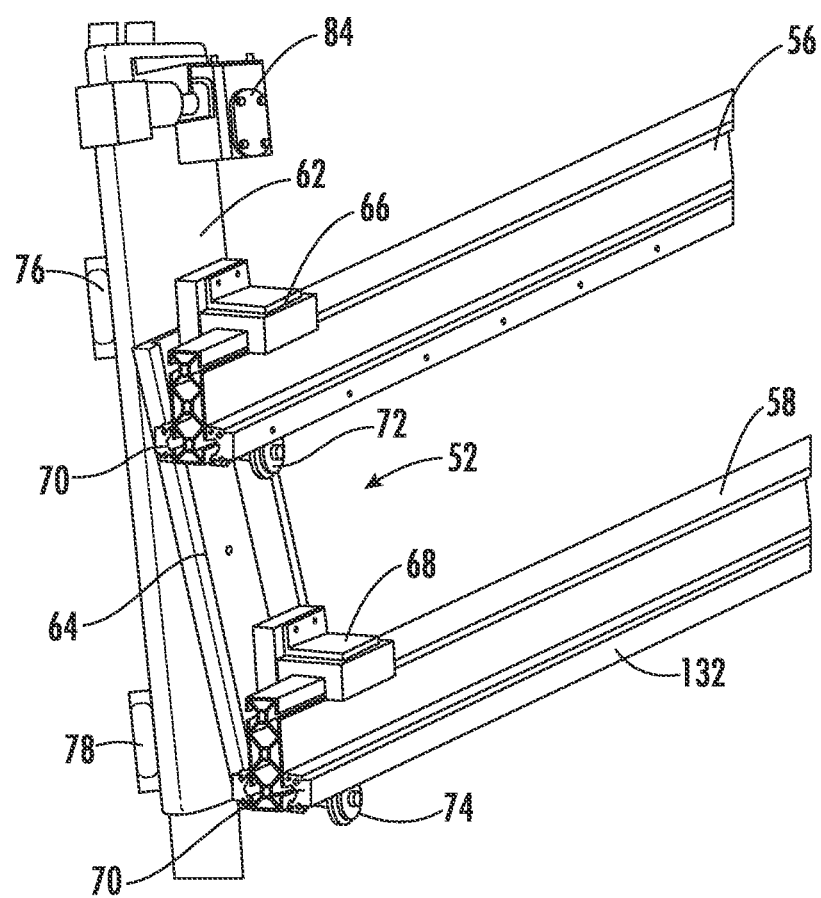
FIG. 5 shows a climbing module of the apparatus of FIG. 1.
Figure 6:
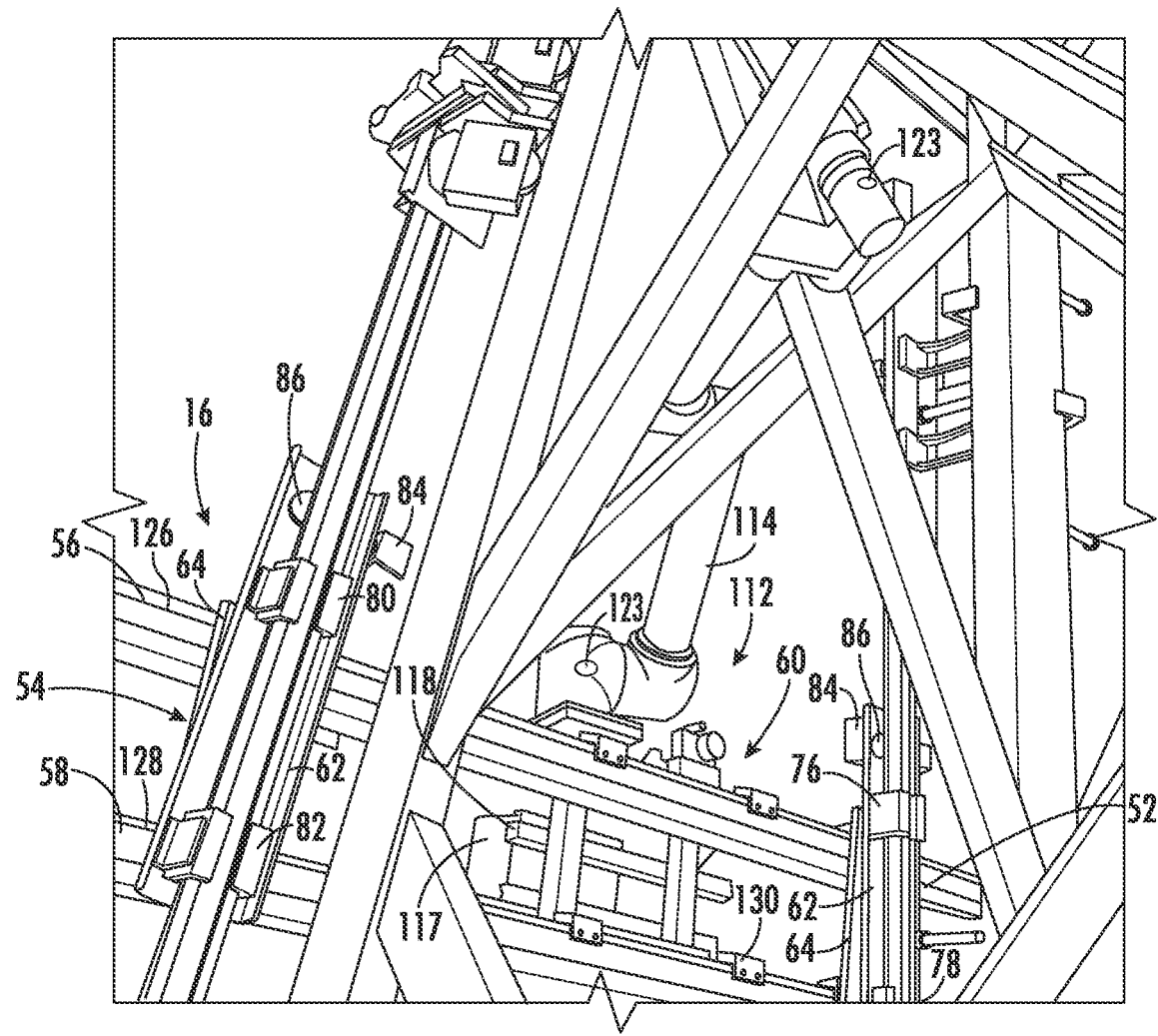
FIG. 6 shows the climbing module of FIG. 5 and upper gripper assembly of FIG. 2.

Referring to FIGS. 1, 5, and 6, carrier assembly 16 includes a first climbing module 52 connected to rail 22 of first climber 12 by guides 76 and 78 and a second climbing module 54 connected to rail 22 of the second climber 14 by guides 80 and 82. Each of the climbing modules 52 and 54 include a base 62 and a secondary canted base 64 connected to the base 62.

The carrier assembly 16 further includes a pair of spaced-apart rails 56 and 58 slidably connected to the first and second climbing modules 52 and 54 and a robot carriage 60 slidably connected to the rails 56 and 58. As shown, the rails 56 and 58 are slidably secured to the canted base 64 by guides 66 and 68. Each of the rails 56 and 58 include a gear track 70 that is engaged by gears 72 and 74 to allow the rails 56 and 58 to move back and forth within the guides 66 and 68. As shown in FIGS. 16-22, the rails 56 and 58 are sectioned (i.e. includes hinged sections) to allow the rails 56 and 58 to shorten in length as the apparatus 10 moves up the power transmission structure 30. As illustrated, rail 56 includes a first end section 90, a middle section 92, and a second end section 94 connected by hinges 96 and rail 58 includes a first end section 98, a middle section 100, and a second end section 102 connected by hinges 104 (See FIG. 17). Hinges 96, 104 may be actuated by any suitable device such as a motor actuator.

Each of the climbing modules 52 and 54 include a motor 84 for driving gear 86. Gear 86 engages gear track 50 to move each of the climbing modules 52 and 54 along the rails 22.

The robot carriage 60 includes a platform 112 slidably connected to rails 56 and 58, an articulating robotic arm 114 connected to the platform 112, tools 116 carried by the platform 112 to allow the articulating robotic arm 114 to pick up and replace tools 116 as needed, a coating supply 110 carried by the platform 112, a control module 117, a power supply 118 to supply power (i.e. to the articulating robotic arm 114, control module 117, etc.), and an electric motor 120 to move the robot carriage 60 along the rails 56 and 58. The tools 116 include, but are not limited to, a grinding wheel 122 and a coating applicator such as sprayer 124. Other mechanical tools that may be used to prepare surfaces for coating include scrapers, sanders, and wire brush. Further, tools such as lasers for paint removal may be used.

A camera 123 provides visual inspections of the power transmission structure 30. The camera 123 may be positioned on the platform 112 or on the articulating robotic arm 114. As shown, the camera 123 is positioned on the articulating robotic arm 114 to allow the camera to see around the entire power transmission structure 30. The camera 123 may be used for pre-inspection, process control during the preparing and coating process, final inspection, and to confirm that the positional location of the apparatus 10 provides adequate access for operations. Multiple cameras 123 may be employed. Further, camera 123 may be a tool 116 picked up and used by the articulating robotic arm 114.

Control module 117 controls the operation of the apparatus 10 and provides for fully autonomous, wireless, and/or wired control of the apparatus 10. As such, the control module allows an operator to decide where the robot travels and what processes are performed. Using the camera 123, the processes may be monitored by the operator and allow operator intervention using ground equipment having a user interface. The user interface provides feedback to the operator and a means of controlling the apparatus 10. The ground equipment may also include power and compressed air generation as well as coating handling equipment. A tether may connect the ground equipment to the apparatus 10, for example, to supply power and coatings.

As shown, the robot carriage 60 is slidably secured to grooves 126 and 128 in rails 56 and 58 respectively by brackets 130. Electric motor 120 (FIG. 7) moves the robot carriage 60 along the rails 56 and 58 by driving a gear which engages with gear track 132. As illustrated, the articulating robotic arm 114 is capable of moving around and extending to areas of the power transmission structure 30 that are in need of maintenance.

Figure 7:
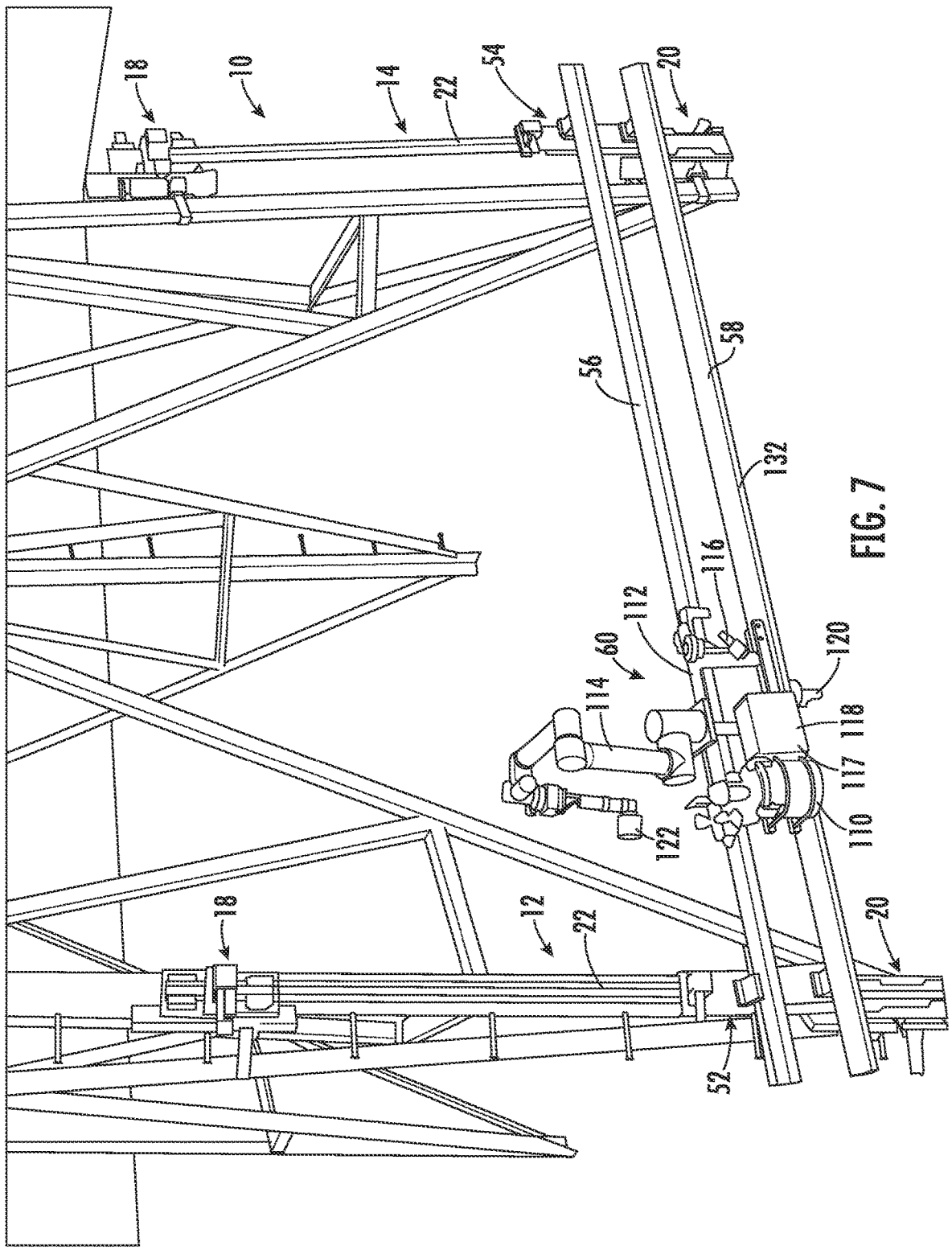
FIG. 7 shows the apparatus of FIG. 1 in a starting position on a power transmission structure to be maintained.

As illustrated in FIG. 7, in use, the apparatus 10 is connected to a bottom of a power transmission structure 30 by connecting the first climber 12 to a first side of the power transmission structure 30 and connecting the second climber 14 to a second side of the power transmission structure 30. In this orientation, the rails 56 and 58 extend horizontally between the first and second climbers 12, 14. The first and second climbing modules 52, 54 are positioned at a bottom of the first and second climbers, 12, 14 respectively to position the rails 56 and 58 near a bottom of the power transmission structure 30. The robot carriage 60 is moved into location to allow the articulating robotic arm 114 to work on the power transmission structure 30.

Figure 8:
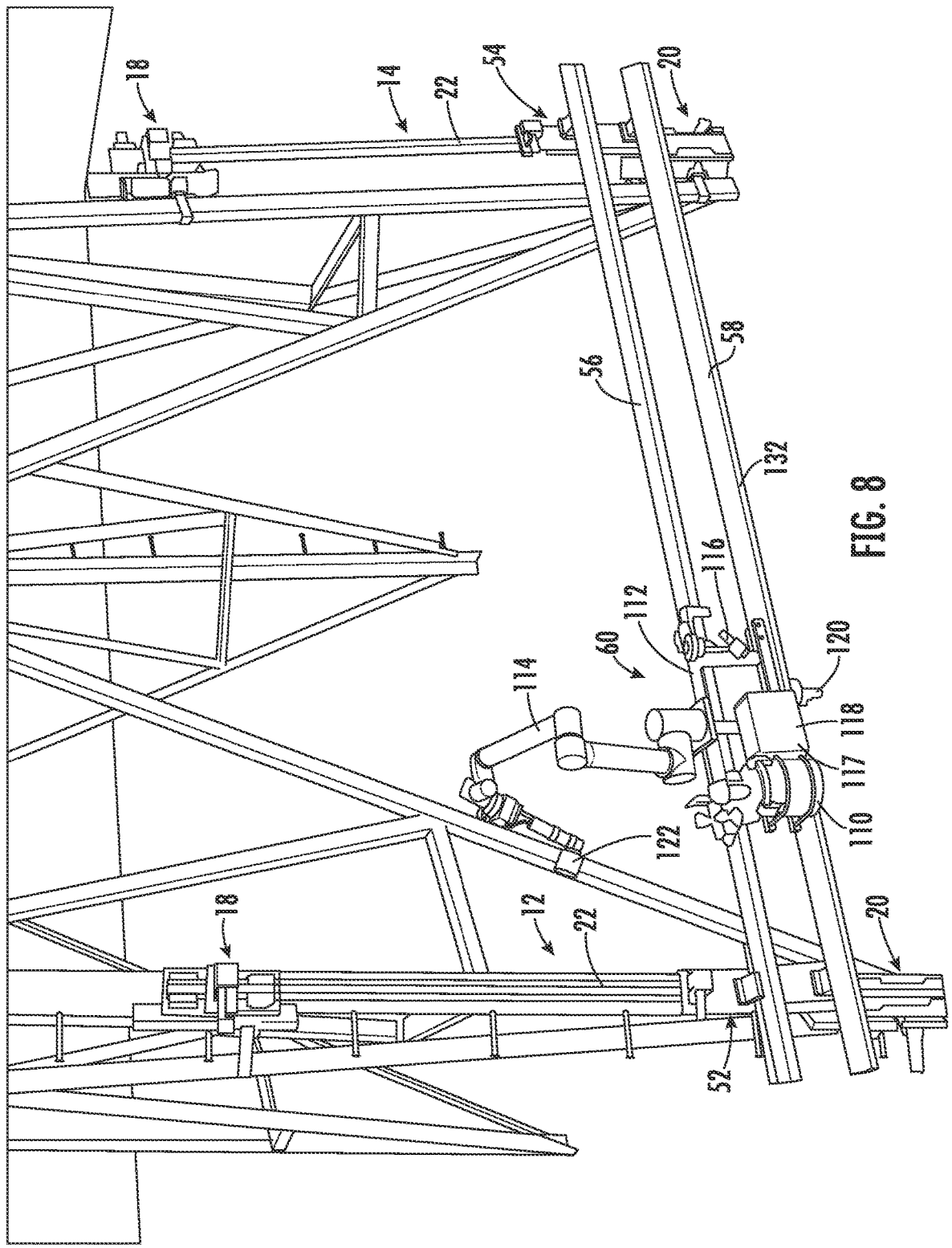
FIGS. 8-10 illustrate a robot prepping a surface of the power transmission structure in the starting position of FIG. 7.
Figure 9:
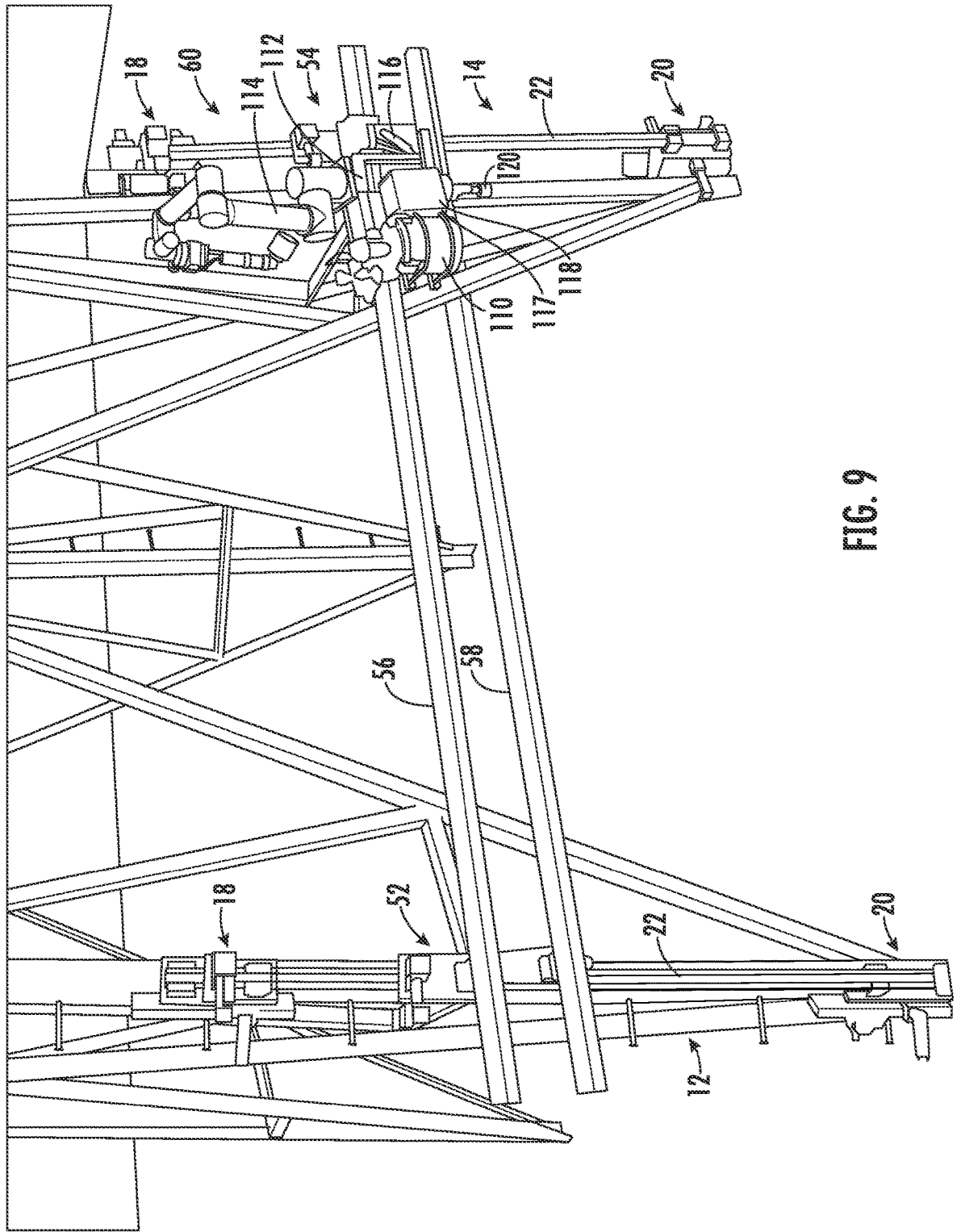
Figure 10:
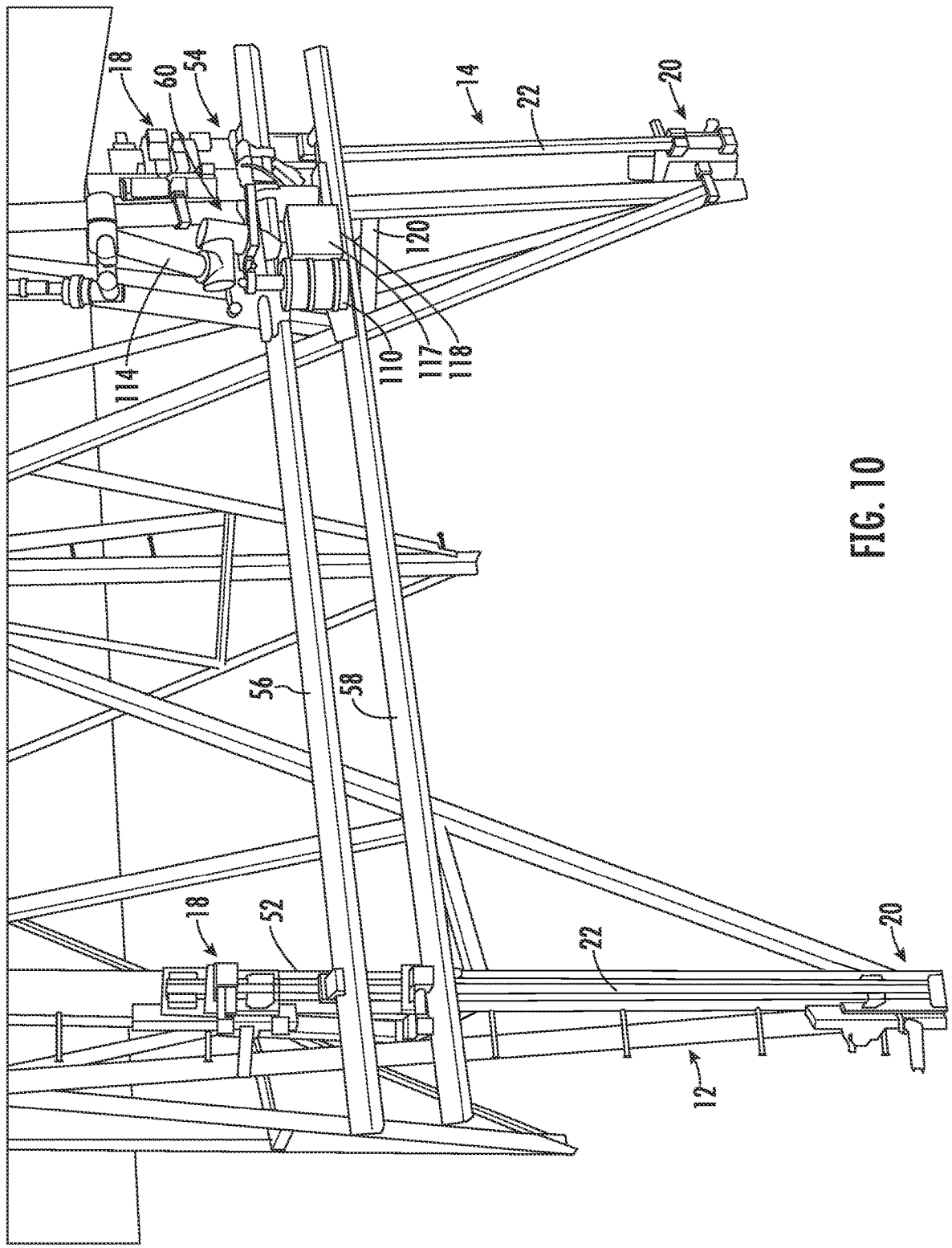
Figure 11:
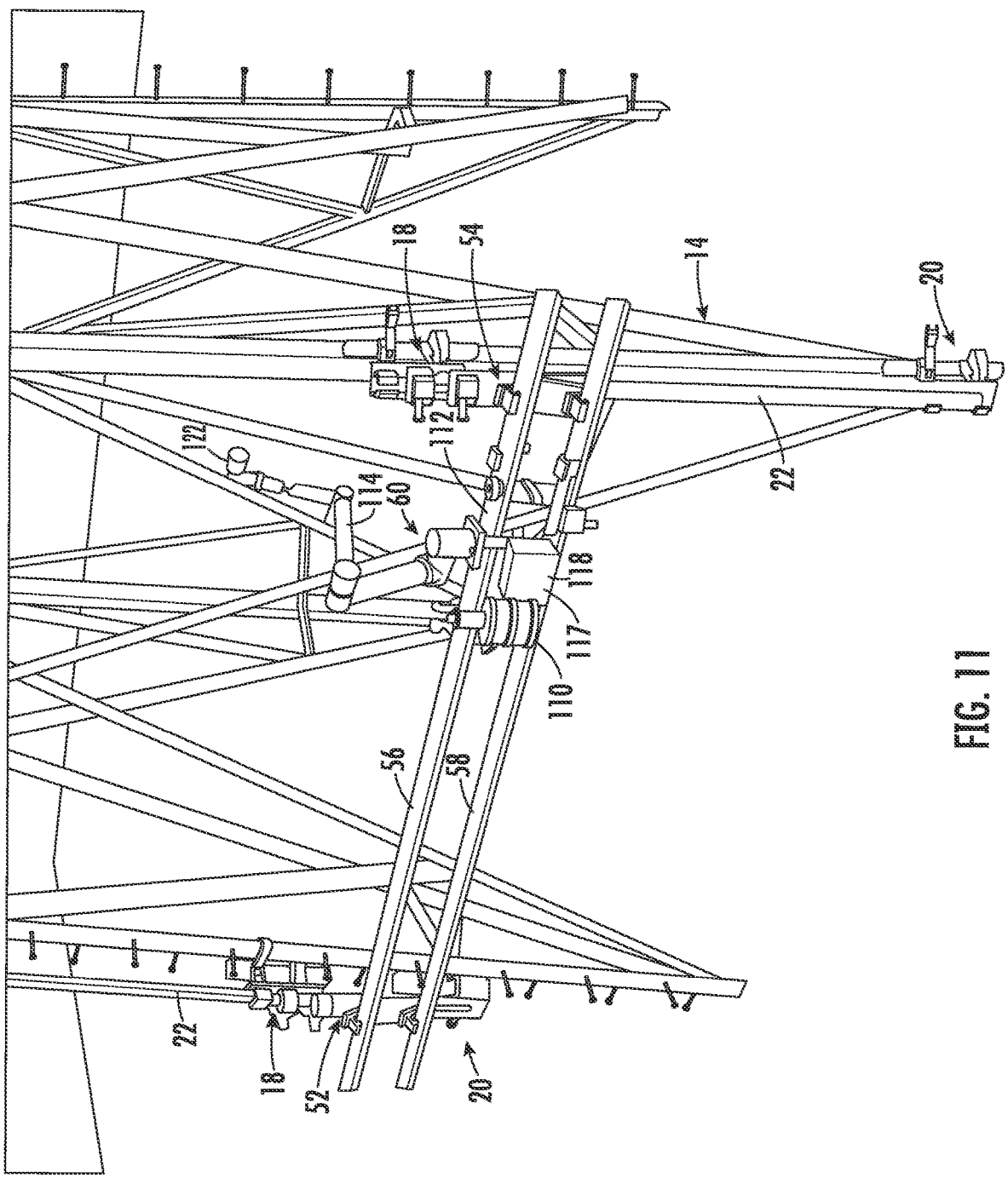
FIGS. 11-15 illustrate the apparatus of FIG. 1 moving from the starting position of FIG. 7 to a new vertical position above the starting position on the power transmission structure.
Figure 12:
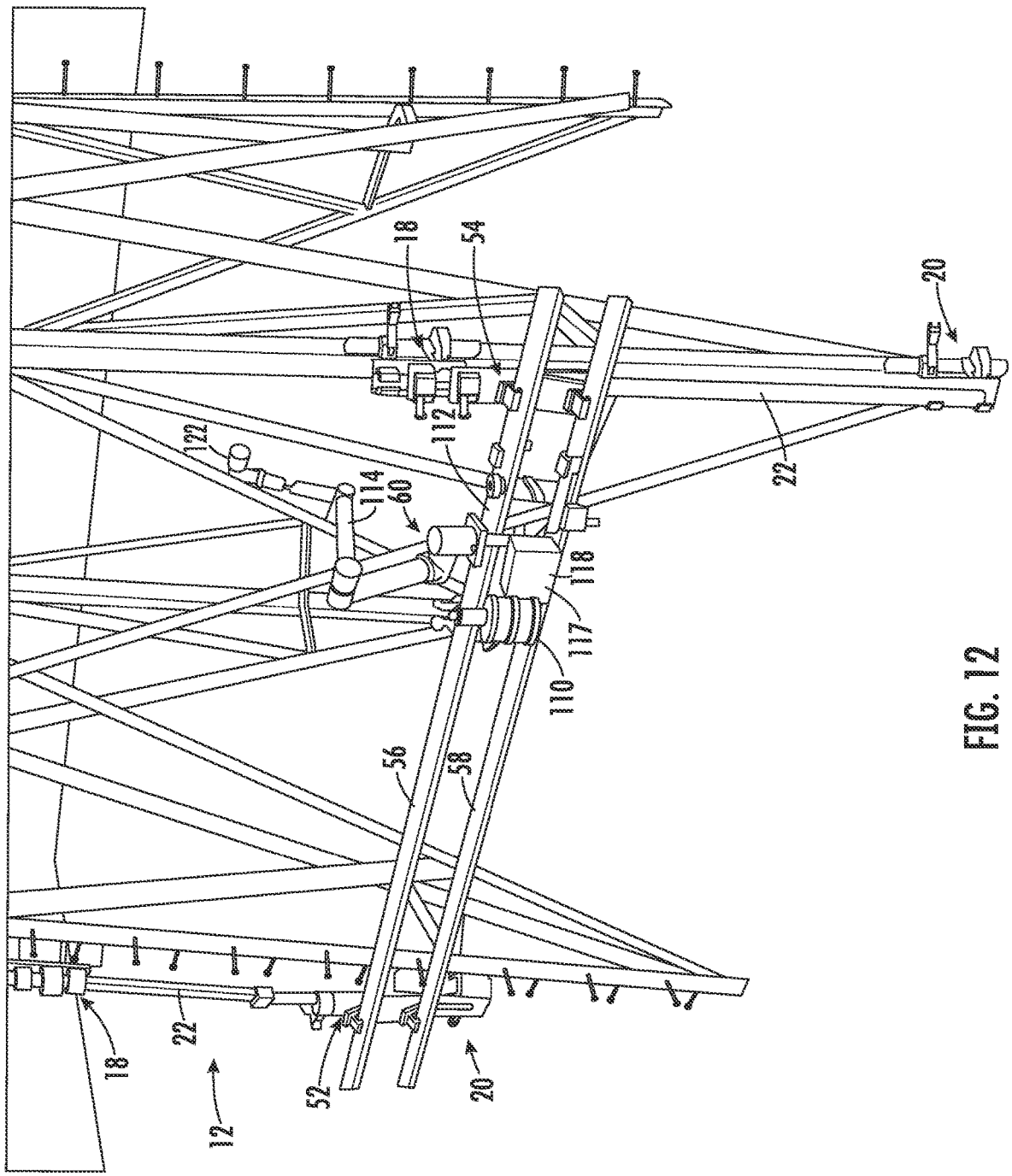
Figure 13:
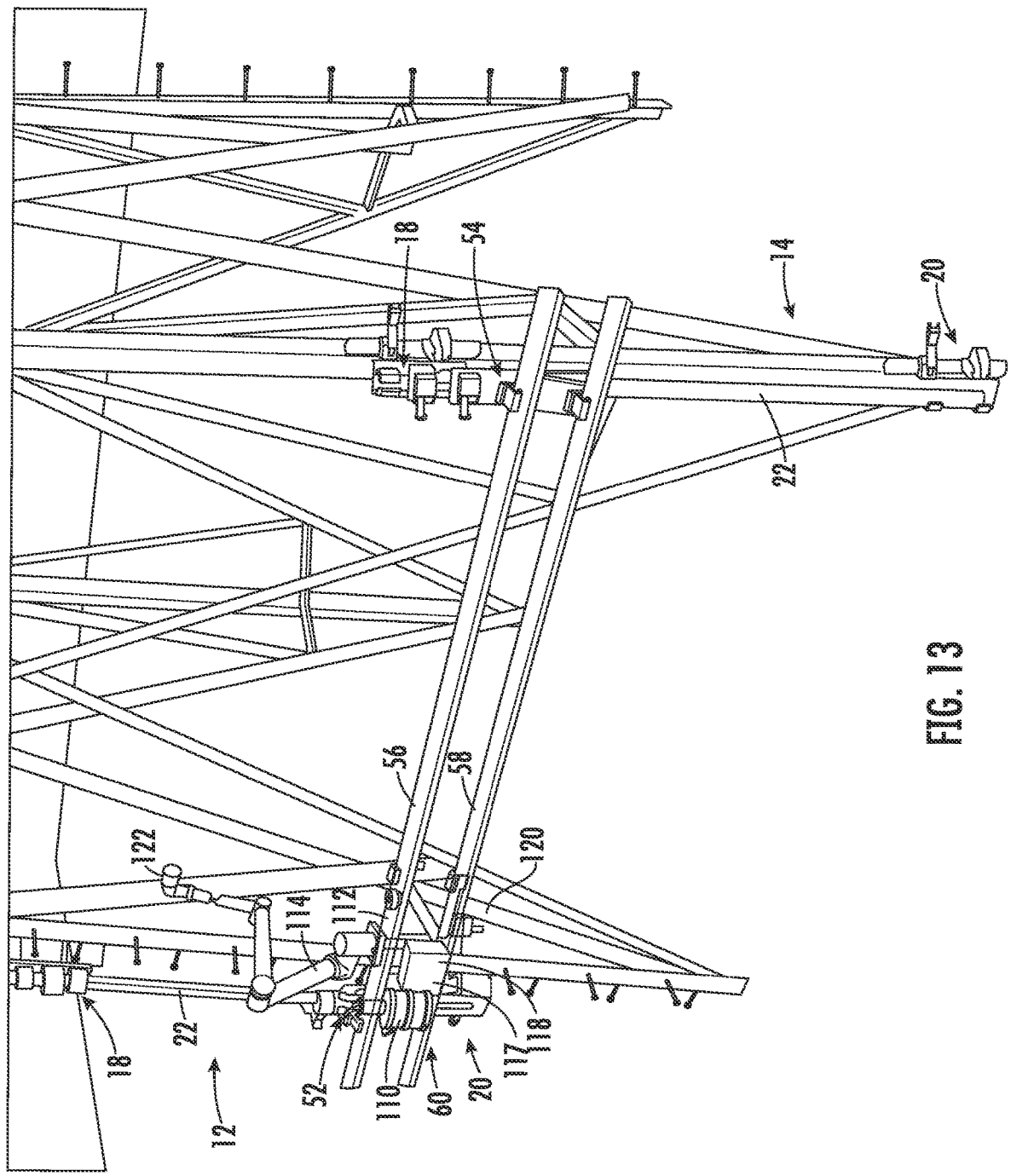
Figure 14:
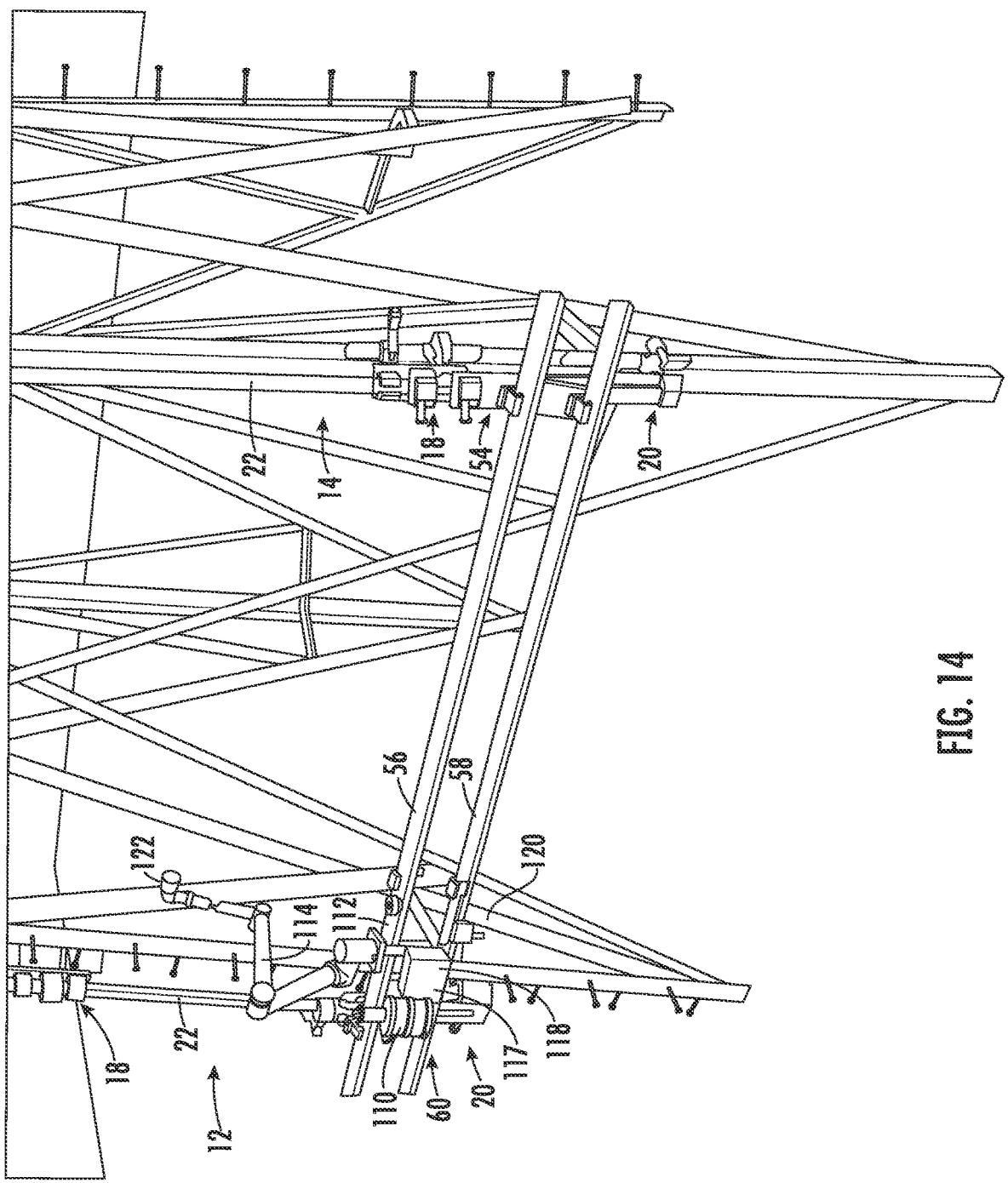
Figure 15:
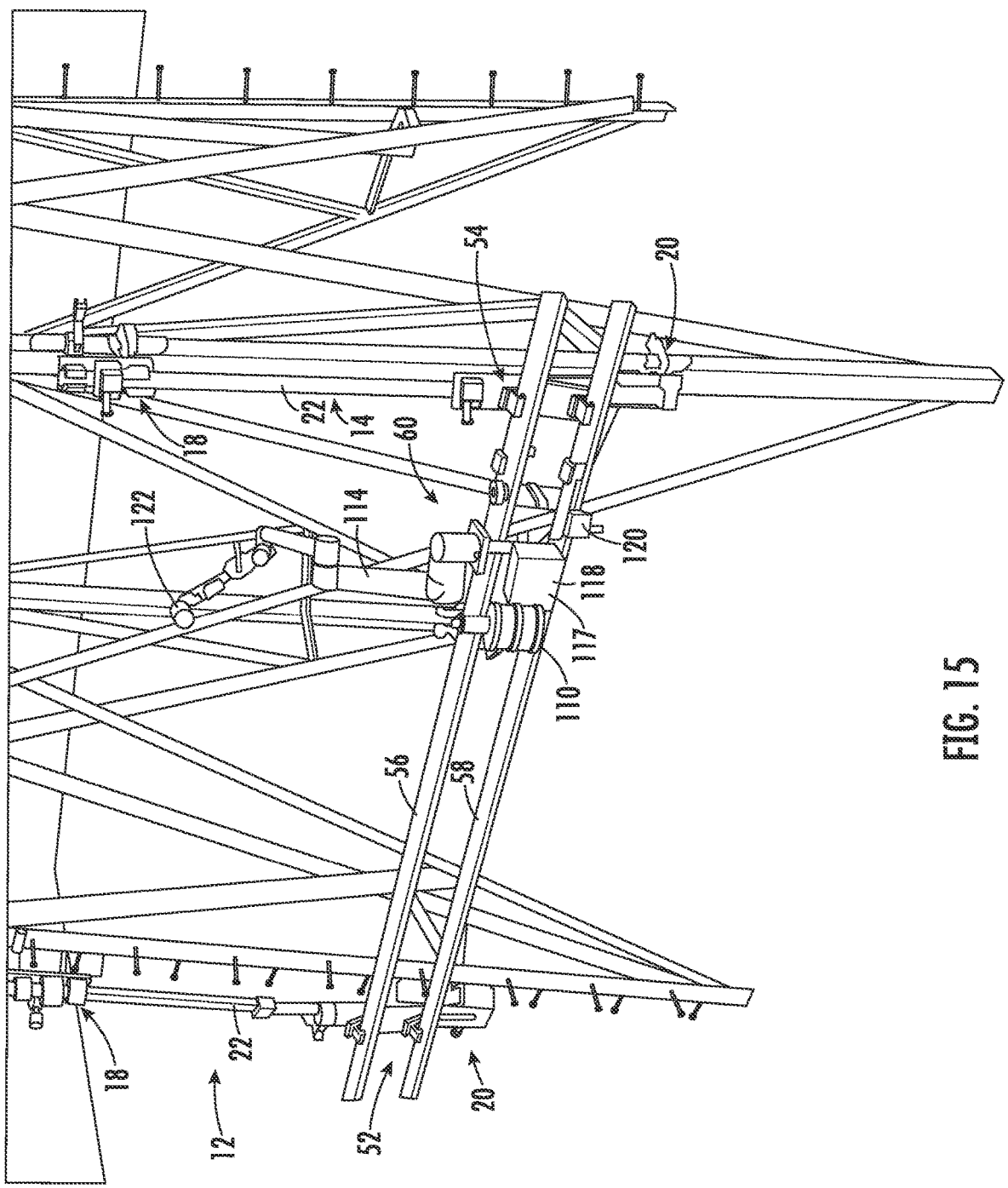

Referring to FIGS. 8-10, the articulating robotic arm 114 begins the maintenance procedure by attaching grinding wheel 122. As shown, grinding wheel 122 is moved along the surfaces of the power transmission structure 30 that need to be prepared for coating and/or maintenance. It should be appreciated, that while the method of prepping and coating the power transmission structure discussed herein is limited to a grinding wheel and sprayer, other tools such as scrapers, paint rollers, etc. may be used. The robot carriage 60 moves horizontally along the rails 56 and 58 to allow the articulating robotic arm 114 to reach the surfaces along an initial height to be prepared for coating.

Once the surfaces at the initial height have been prepared for coating, the carrier assembly 16 is raised to a new height to allow the articulating robotic arm 114 to prepare the surfaces of the power transmission structure 30 at the new height. This is done by moving first and second climbing modules 52 and 54 vertically along rails 22. The robot carriage 60 again moves along the rails 56 and 58 to allow the articulating robotic arm to prepare the surfaces of the structure 30 at the new height. This process continues until the first and second climbing modules 52 and 54 engage the upper gripper assemblies 18, FIG. 10, at a final height of the apparatus 10. It should be appreciated that the carrier assembly 16 may be moved up and down vertically along the first and second climbers 12, 14 in concert with the robot carriage 60 being moved back and forth horizontally to prepare the surfaces and/or apply a coating.

Referring to FIGS. 11-15, once the climbing modules 52 and 54 engage the upper gripper assemblies 18 and the articulating robotic arm 114 has prepared the surfaces of the power transmission structure 30 at the final height, the first and second climbers 12 and 14 move vertically to locate the robot carriage 60 up the power transmission structure 30. This is done by first disengaging hooks 26 of lower gripper assembly 20 connected to rail 22 of the first climber 12. Once the hooks 26 are disengaged, rail 22 of the first climber is raised vertically, thereby raising lower gripper assembly 20, by the first climbing module 52 and/or upper gripper assembly 18 by driving gears 48 and 86 engaged with gear track 50.

Once the lower gripper assembly 20 engages the first climbing module 52, the hooks 26 of the lower gripper assembly 20 reengage the power transmission structure 30 to secure the first climber 12 thereto. The hooks 26 of the upper gripper assembly 18 are then released from engagement with the power transmission structure 30 and the upper gripper assembly 18 moves vertically along the rail 22 by driving gear 48. The upper gripper assembly moves vertically until it reaches a top of the rail 22 and then reengages the hooks 26 with the power transmission structure 30. This process is then repeated for the second climber 14. With the first and second climbers 12 and 14 repositioned on the power transmission structure 30, the process of moving the articulating robotic arm 114 into position for preparing the surfaces, described and shown in FIGS. 8-10, is repeated.

Figure 16:
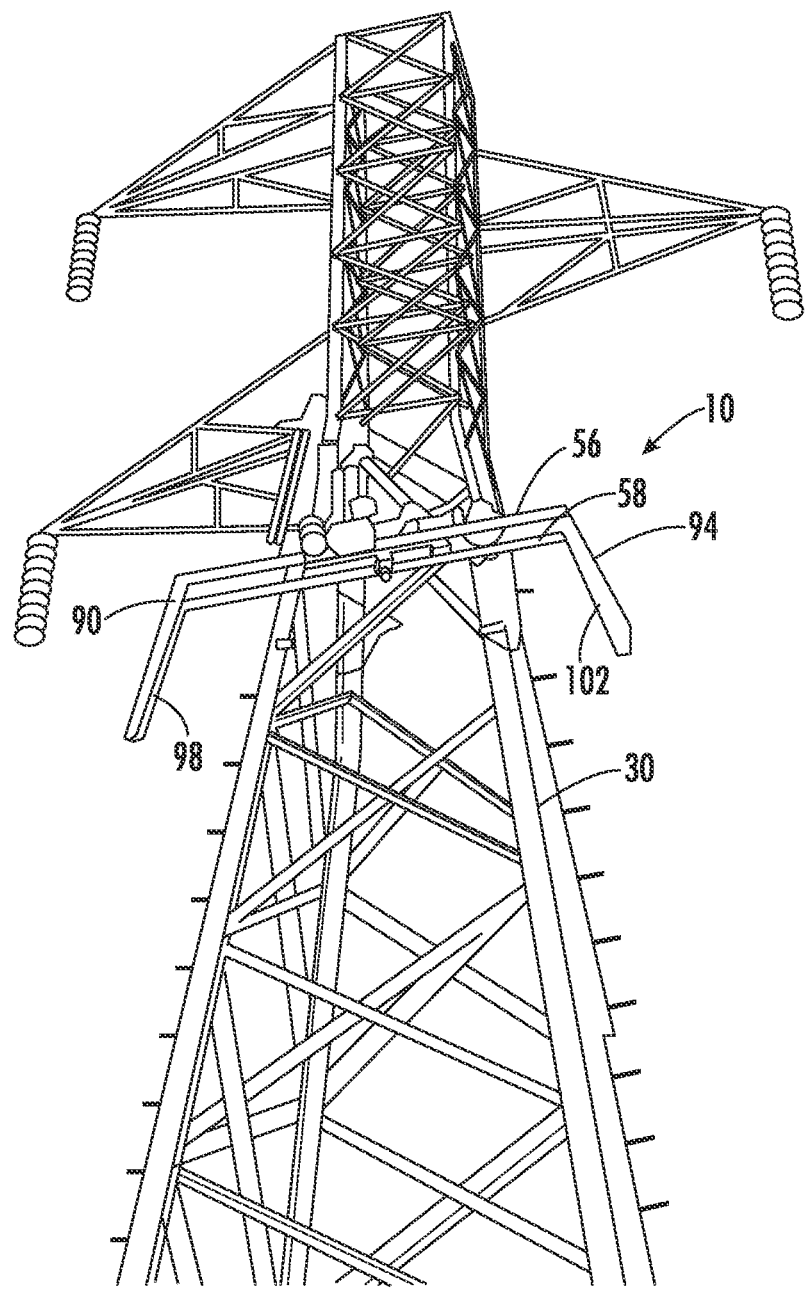
FIGS. 16-17 show the apparatus of FIG. 1 traversing the power transmission structure to a final vertical position above the starting position.
Figure 17:
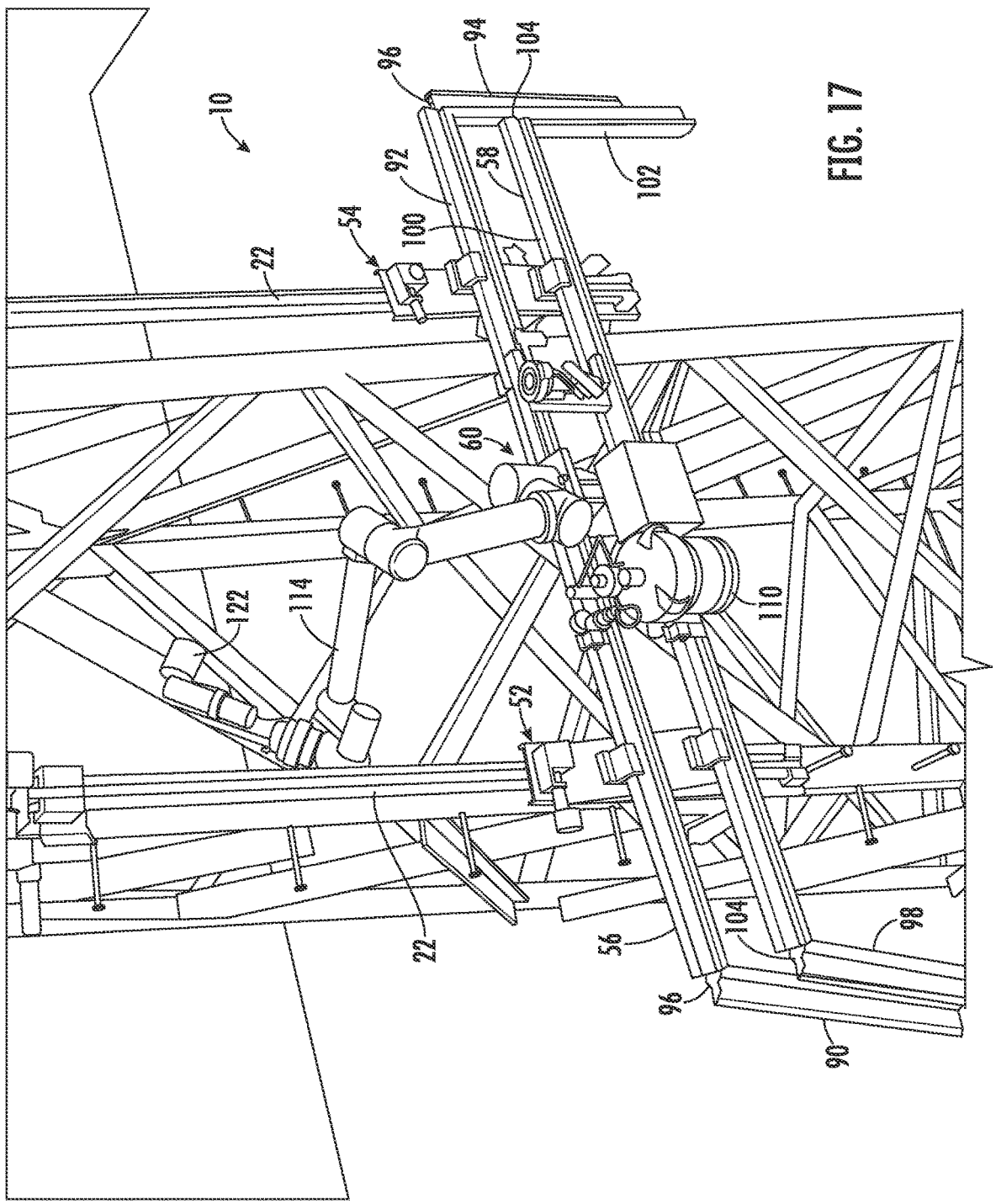

The apparatus 10 continues to move vertically along the power transmission structure 30 as shown in FIGS. 8-15 until it reaches a predetermined vertical location on the power transmission structure 30 or a top of the power transmission structure 30. As illustrated in FIGS. 16 and 17, if the structure 30 narrows in size as the apparatus 10 traverses vertically along the power transmission structure 30, the first and second end sections 90, 94, and 98, 102 of the rails 56 and 58, respectively may be hinged downwardly to allow the rails 56 and 58 to be shortened and avoid interference with other structures such as utility lines and insulators. Additionally, the apparatus has collision avoidance and auto-routing for tracking progress of each operation.

Figure 18:
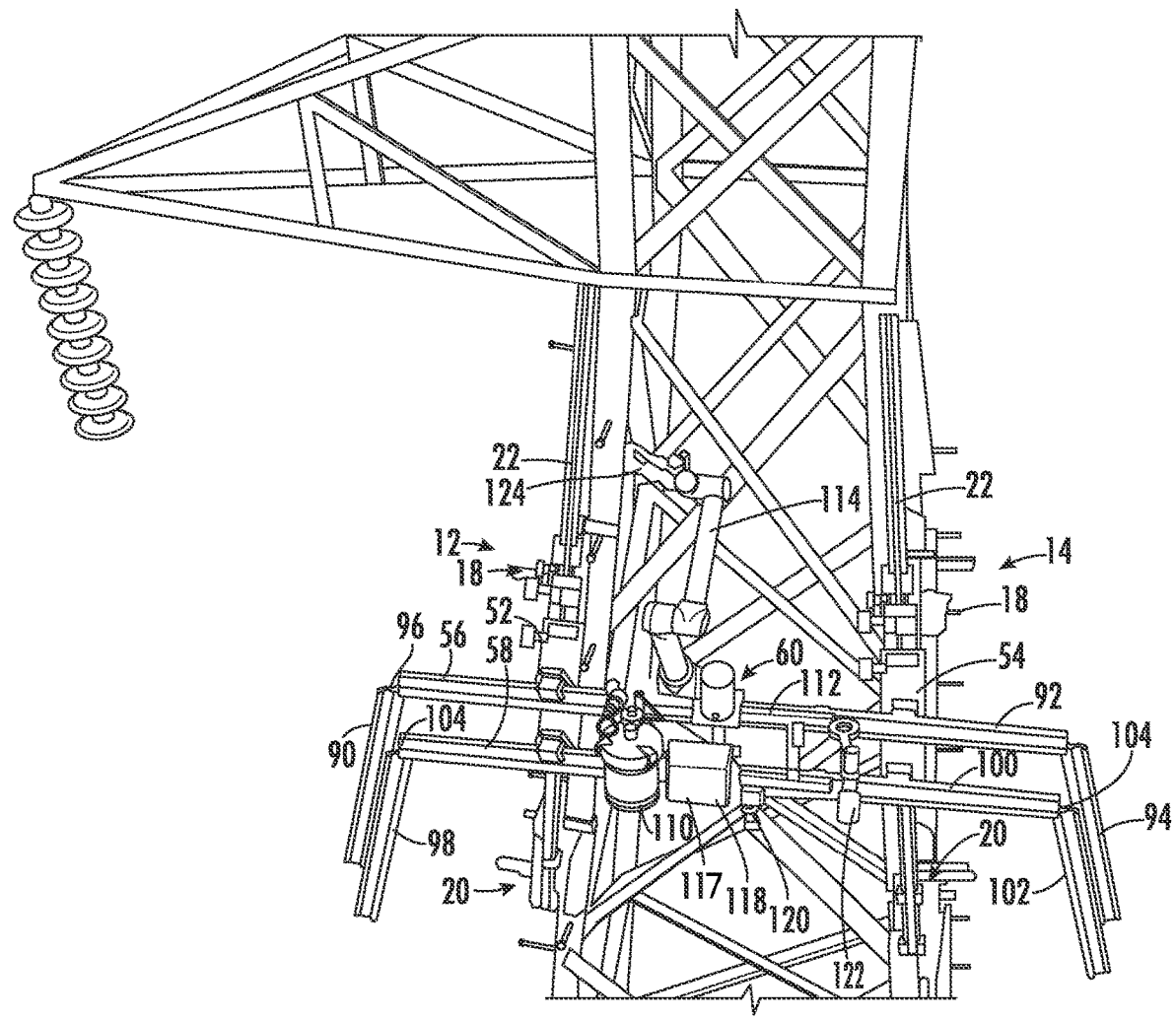
FIGS. 18-19 illustrate the apparatus of FIG. 1 painting the power transmission structure at the final vertical position.
Figure 19:
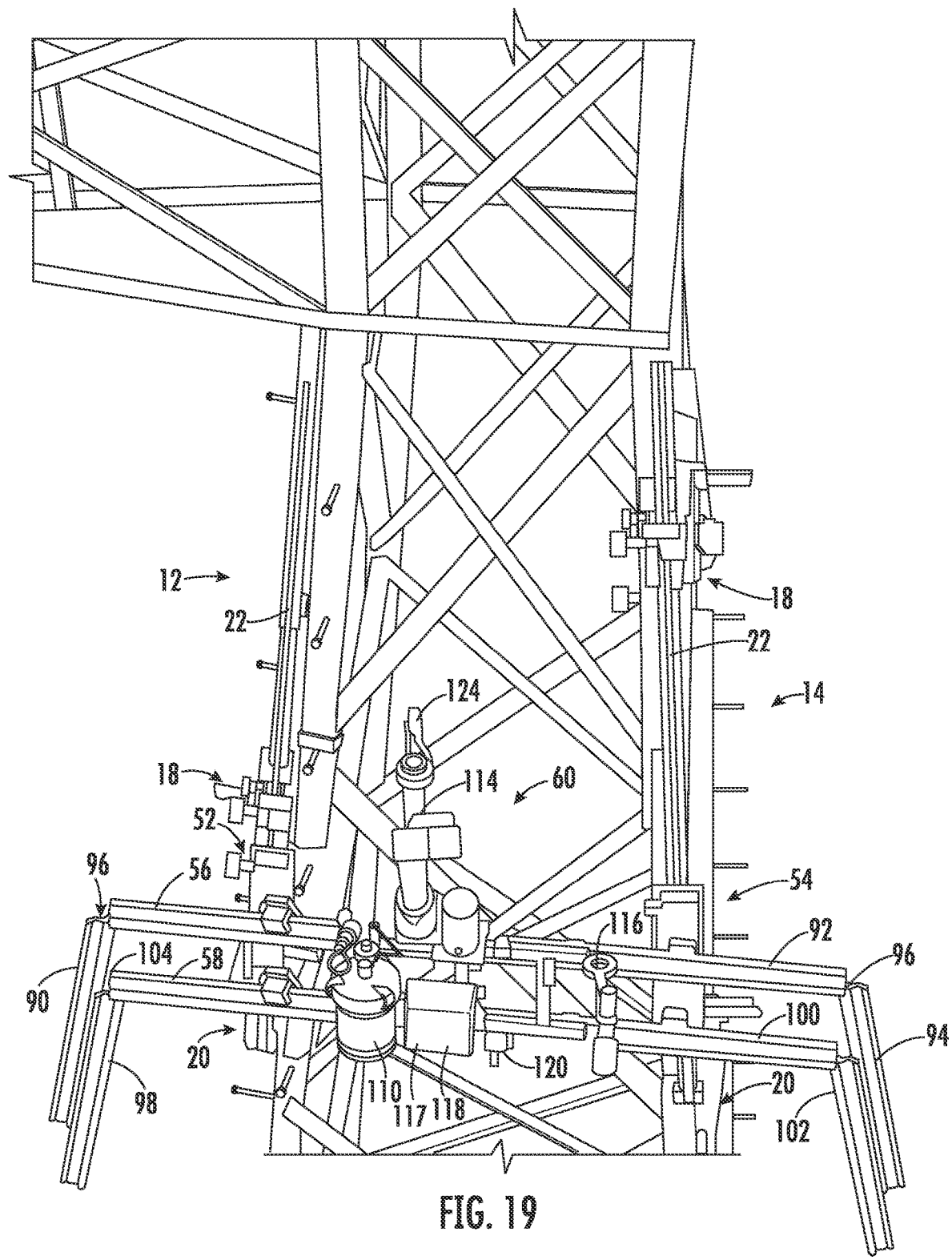
Figure 20:
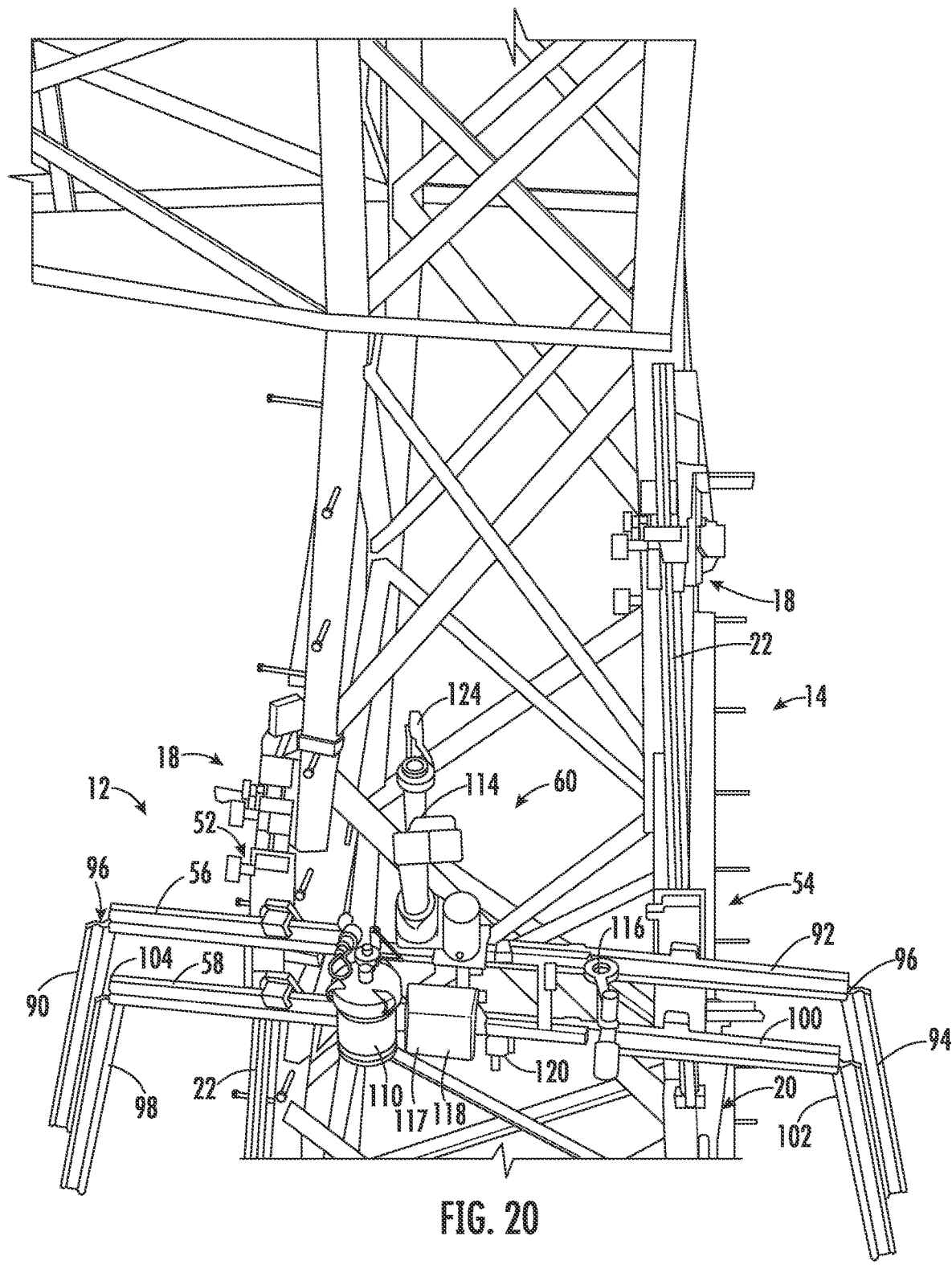
FIGS. 20-22 illustrate the apparatus of FIG. 1 painting the power transmission structure as it moves down the structure from the final vertical position of FIG. 16 towards the starting position of FIG. 7.
Figure 21:
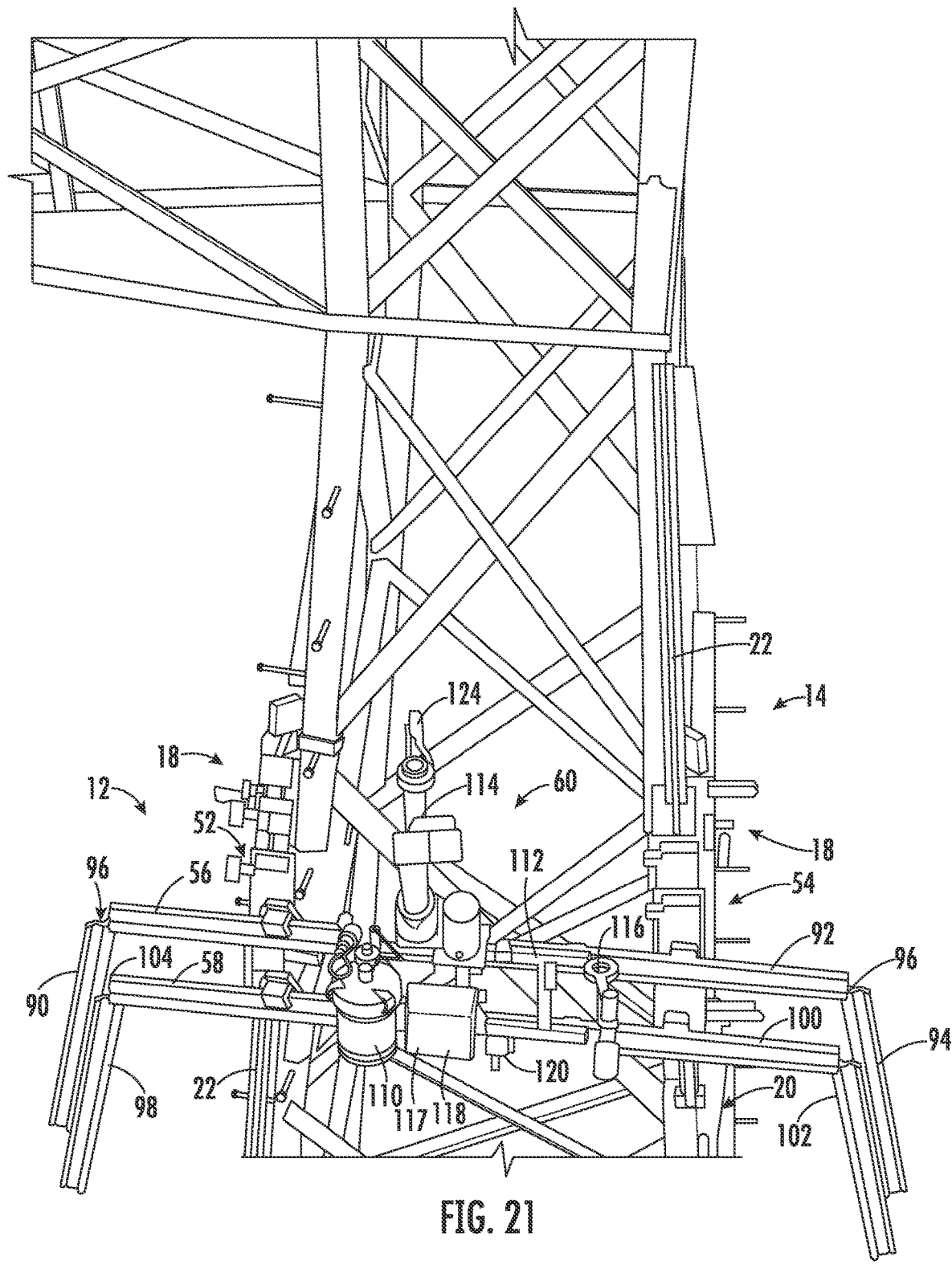
Figure 22:
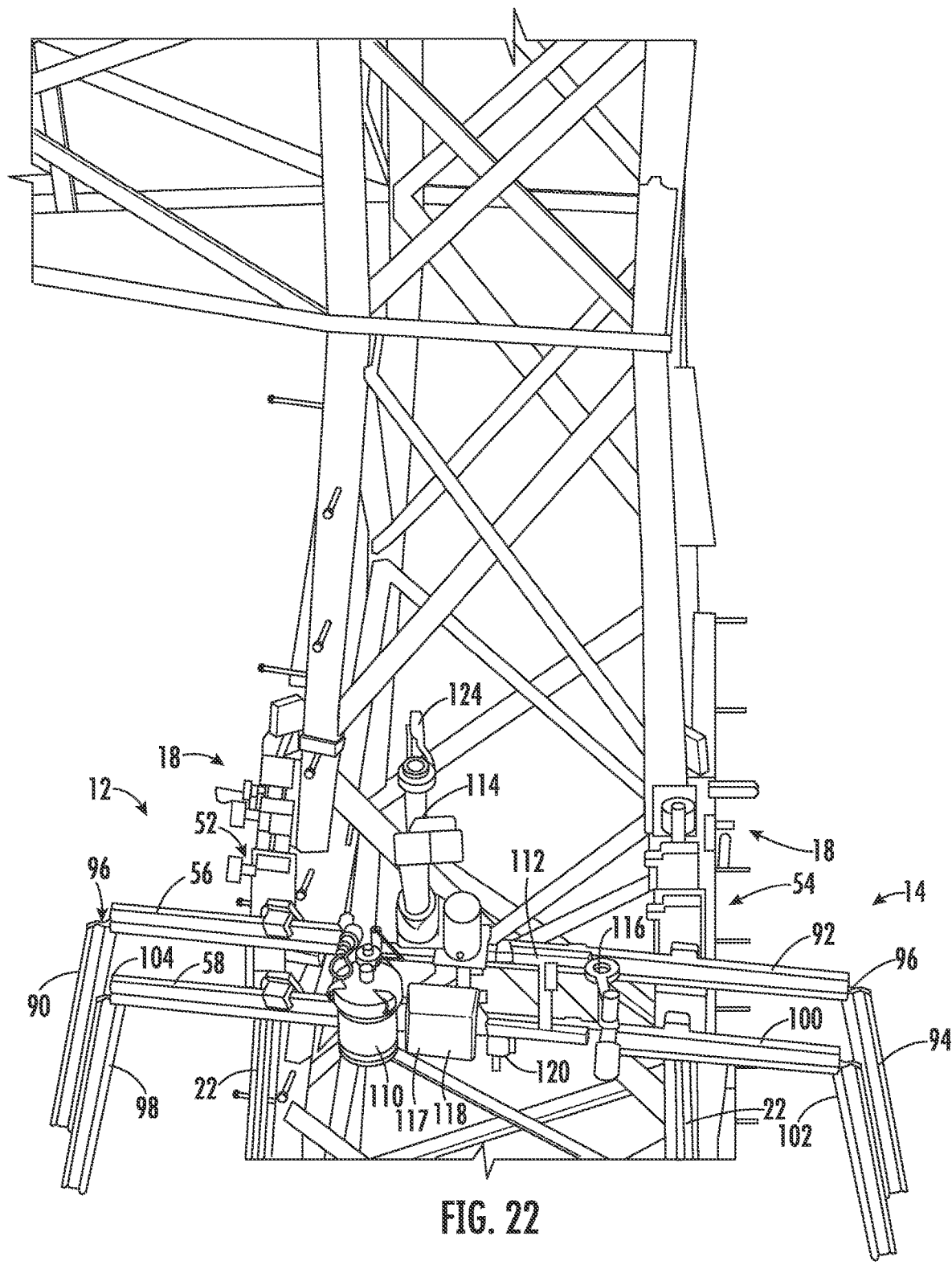

As illustrated in FIGS. 18-22, with the surfaces prepared for coating and the apparatus 10 at its predetermined vertical location, the articulating robotic arm 114 changes from a prepping tool like grinding wheel 122 to a coating tool like sprayer 124. The sprayer 124 is fluidly connected to the coating supply 110 and begins to spray the coating onto the power transmission structure 30. As shown in FIG. 18, the upper gripper assemblies 18 may be moved downwardly along the rails 22 to allow the sprayer 124 to coat the area where the upper gripper assemblies 18 would have been located. The articulating robotic arm 114 continues to traverse the tower both horizontally and vertically as described above until the first and second climbing modules 52 and 54 lower and engage the lower gripper assemblies 20.

Other coating application processes such as brushes, rollers or a combination thereof may also be used in the coating process. Further, electrostatic coatings may be used to provide a uniform and efficient coverage and to reach areas of limited accessibility. Quick drying UV-cured coatings may also be used to expedite delivery of multiple coats and to allow the apparatus 10 to move over coated areas without delay.

Once the first and second modules 52, 54 engage the lower gripper assemblies 20, the apparatus 10 begins to move downwardly along the power transmission structure 30. This is done by disengaging and lowering gripper assembly 18 along rail 22 on the first climber 12 until the lower gripping assembly 18 engages the first climbing module 52. Gripper assembly 18 reengages the structure 30, lower gripping assembly 20 disengages the power transmission structure 30, and rail 22 is then lowered until a top of the rail 22 is located at the upper gripping assembly 18. Upper gripping assembly 18 then reengages the power transmission structure 30 to secure first climber 12 to the structure 30. Then second climber 14 performs the same actions to lower the second climber 14. The articulating robotic arm 114 performs a coating process at this location on the power transmission structure 30 and the process of lowering the apparatus 10 repeats. It should be appreciated that the sequence of moving up and down the power transmission structure 30 may also be performed by moving the second climber 14 first and then the first climber 12.

Prior to preparing and coating the power transmission structure 30, the apparatus 10 may be used as an inspection tool to determine if the power transmission structure 30 needs repair and/or coating by moving up and down the power transmission structure 30 as described above. The inspection process uses camera 123 to provide an operator on the ground with a visual assessment of the power transmission structure 30. Image processing may also be performed.

The foregoing has described a power transmission structure maintenance apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A power transmission structure maintenance apparatus, comprising:
    a first climber;
    a second climber spaced from the first climber;
    a carrier assembly positioned between the first and second climbers and slidably connected to the first climber and to the second climber; and
    a carriage positioned on the carrier assembly and including a robotic arm, the carriage moveable along the carrier assembly to position the robotic arm in a predetermined position along a power transmission structure to allow the robotic arm to perform maintenance on the power transmission structure;
    wherein the first and second climbers each include an upper gripper assembly, a lower gripper assembly, and a rail positioned therebetween; and wherein each of the gripper assemblies includes hooks that are pivotally mounted to a base and configured to selectively engage and disengage a power transmission structure.

2. The maintenance apparatus of claim 1, wherein the carrier assembly includes a first climbing module slidably connected to the rail of first climber and a second climbing module slidably connected to the rail of the second climber.

3. The maintenance apparatus of claim 2, wherein:
the first climbing module includes a motor-driven gear engaging a gear track of the rail of the first climber to move the first climbing module along the rail of the first climber; and
the second climbing module includes a motor-driven gear engaging a gear track of the rail of the second climber to move the second climbing module along the rail of the first climber.

4. The maintenance apparatus of claim 2, wherein the carrier assembly further includes a pair of spaced-apart rails and slidably connected to the first and second climbing modules and the carriage is slidably connected to the spaced-apart rails of the carrier assembly.

5. The maintenance apparatus of claim 2, wherein the carrier assembly further includes a pair of spaced-apart rails and slidably connected to the first and second climbing modules and each of the spaced-apart rails of the carrier assembly comprise two or more sections connected to each other by hinges.

6. The maintenance apparatus of claim 1, wherein the carriage is equipped with at least one surface preparation tool and least one coating applicator.

7. The maintenance apparatus of claim 6, wherein the surface preparation tool is selected from the group consisting of grinding wheels, scrapers, sanders, wire brushes, and lasers.

8. The maintenance apparatus of claim 6, wherein the coating applicator is selected from the group consisting of sprayers, brushes, and rollers.

9. A power transmission structure maintenance apparatus, comprising:
a first climber;
a second climber spaced from the first climber;
a carrier assembly positioned between the first and second climbers and slidably connected to the first climber and to the second climber; and
a carriage positioned on the carrier assembly and including a robotic arm, the carriage moveable along the carrier assembly to position the robotic arm in a predetermined position along a power transmission structure to allow the robotic arm to perform maintenance on the power transmission structure;
wherein the first and second climbers each include an upper gripper assembly, a lower gripper assembly, and a rail positioned therebetween; and
wherein each of the upper gripper assemblies includes a motor-driven gear engaging a gear track of the rail of the corresponding climber.

10. The maintenance apparatus of claim 9, wherein the carrier assembly includes a first climbing module slidably connected to rail of first climber and a second climbing module slidably connected to the rail of the second climber.

11. The maintenance apparatus of claim 10, wherein:
the first climbing module includes a motor-driven gear engaging a gear track of the rail of the first climber to move the first climbing module along the rail of the first climber; and
the second climbing module includes a motor-driven gear engaging a gear track of the rail of the second climber to move the second climbing module along the rail of the first climber.

12. The maintenance apparatus of claim 10, wherein the carrier assembly further includes a pair of spaced-apart rails and slidably connected to the first and second climbing modules and the carriage is slidably connected to the rails.

13. The maintenance apparatus of claim 9, wherein the carrier assembly further includes a pair of spaced-apart rails and slidably connected to the first and second climbing modules and each of the spaced-apart rails of the carrier assembly comprise two or more sections connected to each other by hinges.

14. The maintenance apparatus of claim 9, wherein the carriage is equipped with at least one surface preparation tool and least one coating applicator.

15. The maintenance apparatus of claim 14, wherein the surface preparation tool is selected from the group consisting of grinding wheels, scrapers, sanders, wire brushes, and lasers.

16. The maintenance apparatus of claim 14, wherein the coating applicator is selected from the group consisting of sprayers, brushes, and rollers.

17. A method of maintaining a power transmission structure, comprising:
providing a maintenance apparatus, comprising:
a first climber;
a second climber spaced from the first climber;
a carrier assembly positioned between the first and second climbers and slidably connected to the first climber and to the second climber; and
a carriage positioned on the carrier assembly and including a robotic arm, the carriage moveable along the carrier assembly to allow the robotic arm to perform maintenance on the power transmission structure;
wherein the first and second climbers each include an upper gripper assembly, a lower gripper assembly, and a rail positioned therebetween; and
wherein each of the gripper assemblies includes hooks that are pivotally mounted to a base and configured to selectively engage and disengage a power transmission structure:
coupling the maintenance apparatus to the power transmission structure at or near ground level;
using a surface preparation tool manipulated by the robotic arm to prepare a surface of the power transmission structure; and
using a coating application tool manipulated by the robotic arm to apply a coating to the prepared surface of the power transmission structure.

18. The method of claim 17, further comprising using the first and second climbers to move the maintenance apparatus to different locations on the power transmission structure.

19. The method of claim 17, wherein the step of preparing a surface of the power transmission structure includes:
(a) using a surface preparation tool manipulated by the robotic arm to prepare a surface of the power transmission structure;
(b) using the first and second climbers to raise the maintenance apparatus to a new location on the power transmission structure; and
(c) repeating steps (a) and (b) until the maintenance apparatus reaches an upper portion of the power transmission structure.

20. The method of claim 17, wherein the step of coating a surface of the power transmission structure includes:
- (a) using the first and second climbers to raise the maintenance apparatus to an upper portion of the power transmission structure;
- (b) using a coating application tool manipulated by the robotic arm to coat the prepared surface of the power transmission structure;
- (c) using the first and second climbers to move the maintenance apparatus to a new location on the power transmission structure; and
- (d) repeating steps (b) and (c) until the maintenance apparatus reaches at or near ground level.

21. The method of claim 17, wherein:
the carriage is equipped with at least one surface preparation tool and least one coating applicator; and
the step of preparing a surface of the power transmission structure includes using the robotic arm to retrieve the surface preparation tool from the carriage.

22. The method of claim 21, wherein the surface preparation tool is selected from the group consisting of grinding wheels, scrapers, sanders, wire brushes, and lasers.

23. The method of claim 17, wherein:
the carriage is equipped with at least one surface preparation tool and least one coating applicator; and
the step of preparing a surface of the power transmission structure includes using the robotic arm to retrieve the coating applicator from the carriage.

24. The method of claim 23, wherein the coating applicator is selected from the group consisting of sprayers, brushes, and rollers.

* * * * *